United States Patent
Gopalakrishnan et al.

(10) Patent No.: US 12,136,805 B2
(45) Date of Patent: Nov. 5, 2024

(54) APPARATUS AND METHOD FOR ARC FAULT PROTECTION

(71) Applicant: GM Global Technology Operations LLC, Detroit, MI (US)

(72) Inventors: Suresh Gopalakrishnan, Troy, MI (US); Muhammad Hussain Alvi, Troy, MI (US); Chandra S. Namuduri, Troy, MI (US); Lyall Kenneth Winger, Waterloo (CA); James Morrison, Sebringville (CA); Xinyu Du, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/889,023

(22) Filed: Aug. 16, 2022

(65) Prior Publication Data
US 2024/0063628 A1    Feb. 22, 2024

(51) Int. Cl.
*H02H 3/087*   (2006.01)
*H02H 1/00*    (2006.01)

(52) U.S. Cl.
CPC .......... *H02H 3/087* (2013.01); *H02H 1/0015* (2013.01)

(58) Field of Classification Search
CPC .................... H02H 1/0015; H02H 3/00–52
See application file for complete search history.

(56) References Cited

U.S. PATENT DOCUMENTS

| | | | |
|---|---|---|---|
| 2013/0038971 A1* | 2/2013 | Ward | H02H 1/0015 361/86 |
| 2015/0244165 A1* | 8/2015 | Roesner | H02H 3/087 361/79 |
| 2023/0231372 A1* | 7/2023 | Sarraf | B60L 3/04 320/109 |

* cited by examiner

*Primary Examiner* — Jared Fureman
*Assistant Examiner* — Christopher J Clark
(74) *Attorney, Agent, or Firm* — CANTOR COLBURN LLP

(57) ABSTRACT

A vehicle, arc fault protection device of the vehicle and a method for mitigating an arc fault in an electrical system of the vehicle. The arc fault protection device includes a sensor, a switch, and a processor. The sensor is used for measuring a current in an electrical system. The processor is configured to determine a precursor phase of an arc fault from the current, wherein the precursor phase indicates an onset of an arc flash phase of the arc fault. The processor opens the switch to mitigate the arc fault during the arc flash phase.

20 Claims, 6 Drawing Sheets

APPARATUS AND METHOD FOR ARC FAULT PROTECTION

INTRODUCTION

The subject disclosure relates to arc fault protection for electrical systems of vehicles and, in particular, to a system and method of detecting an onset of an arc fault and performing an action to mitigate the arc fault.

Due to the increased power demands being placed on vehicles, automotive electrical systems are being built that provide high voltages. In many vehicles, a +48 volt battery system is being used to provide higher electrical power while also improving the fuel economy of the vehicle. A power net voltage above about 20 V can potentially cause the occurrence of an arc fault. Since an arc fault generally does not result in an over current or an over voltage, it can go undetected by protection devices. Accordingly, it is desirable to provide a system and method of detecting an arc fault in high voltage electrical systems and taking corrective actions.

SUMMARY

In one exemplary embodiment, a method for mitigating an arc fault in an electrical system of a vehicle is disclosed. A current is measured in the electrical system. A precursor phase of the arc fault is detected from the current, wherein the precursor phase indicates an onset of an arc flash phase of the arc fault. A switch is opened in the electrical system to mitigate the arc fault during the arc flash phase.

In addition to one or more of the features described herein, determining the precursor phase further includes determining a current signature from the current and comparing the current signature to a first precursor threshold. Comparing the current signature to the first precursor threshold further includes performing a first comparison and a second comparison. The method further includes comparing the current signature to a second precursor threshold at a selected time after comparing the current signature to the first precursor threshold and opening the switch when the current signature exceeds than the second precursor threshold. The switch is one of an electrical fuse and a mechanical switch in series with a mechanical fuse. The vehicle is one of an electric vehicle, a hybrid vehicle, a gasoline-powered vehicle, and a diesel-powered vehicle. Determining the precursor phase further includes at least one of filtering the current, performing a Fourier analysis of the current, performing a moving widow filtering of a time-derivative of the current, performing a wavelet analysis of the current, and performing a hardware-based filtering of the current.

In another exemplary embodiment, an arc fault protection device for use in a vehicle is disclosed. The arc fault protection device includes a sensor, a switch, and a processor. The sensor measures a current in an electrical system. The processor is configured to determine a precursor phase of an arc fault from the current, wherein the precursor phase indicates an onset of an arc flash phase of the arc fault. The processor opens the switch to mitigate the arc fault during the arc flash phase.

In addition to one or more of the features described herein, the processor is further configured to determine a current signature from the current and compare the current signature to a first precursor threshold. The processor is further configured to compare the current signature to the first precursor threshold by performing a first comparison and a second comparison. The processor is further configured to compare the current signature to a second precursor threshold at a selected time after comparing the current signature to the first precursor threshold and open the switch when the current signature exceeds than the second precursor threshold. The switch is one of an electrical fuse and a mechanical switch in series with a mechanical fuse. The vehicle is one of an electric vehicle, a hybrid vehicle, a gasoline-powered vehicle, and a diesel-powered vehicle. The processor is further configured to determine the current by performing at least one of filtering the current, performing a Fourier analysis of the current, performing a moving widow filtering of a time-derivative of the current, performing a wavelet analysis of the current, and performing a hardware-based filtering of the current.

In yet another exemplary embodiment, a vehicle is disclosed. The vehicle includes a sensor, a switch, and a processor. The sensor measures a current in an electrical circuit of the vehicle. The processor is configured to determine a precursor phase of an arc fault in the electrical circuit from the current, wherein the precursor phase indicates an onset of an arc flash phase of the arc fault. The processor opens the switch in the electrical circuit to mitigate the arc fault during the arc flash phase.

In addition to one or more of the features described herein, the processor is further configured to determine a current signature from the current and compare the current to a first precursor threshold. The processor is further configured to compare the current signature to a second precursor threshold at a selected time after comparing the current signature to the first precursor threshold and open the switch when the current signature exceeds than the second precursor threshold. The switch is one of an electrical fuse and a mechanical switch in series with a mechanical fuse. The vehicle is one of an electric vehicle, a hybrid vehicle, a gasoline-powered vehicle, and a diesel-powered vehicle. The processor is further configured to determine the precursor phase by performing at least one of filtering the current, performing a Fourier analysis of the current, performing a moving widow filtering of a time-derivative of the current, performing a wavelet analysis of the current, and performing a hardware-based filtering of the current.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
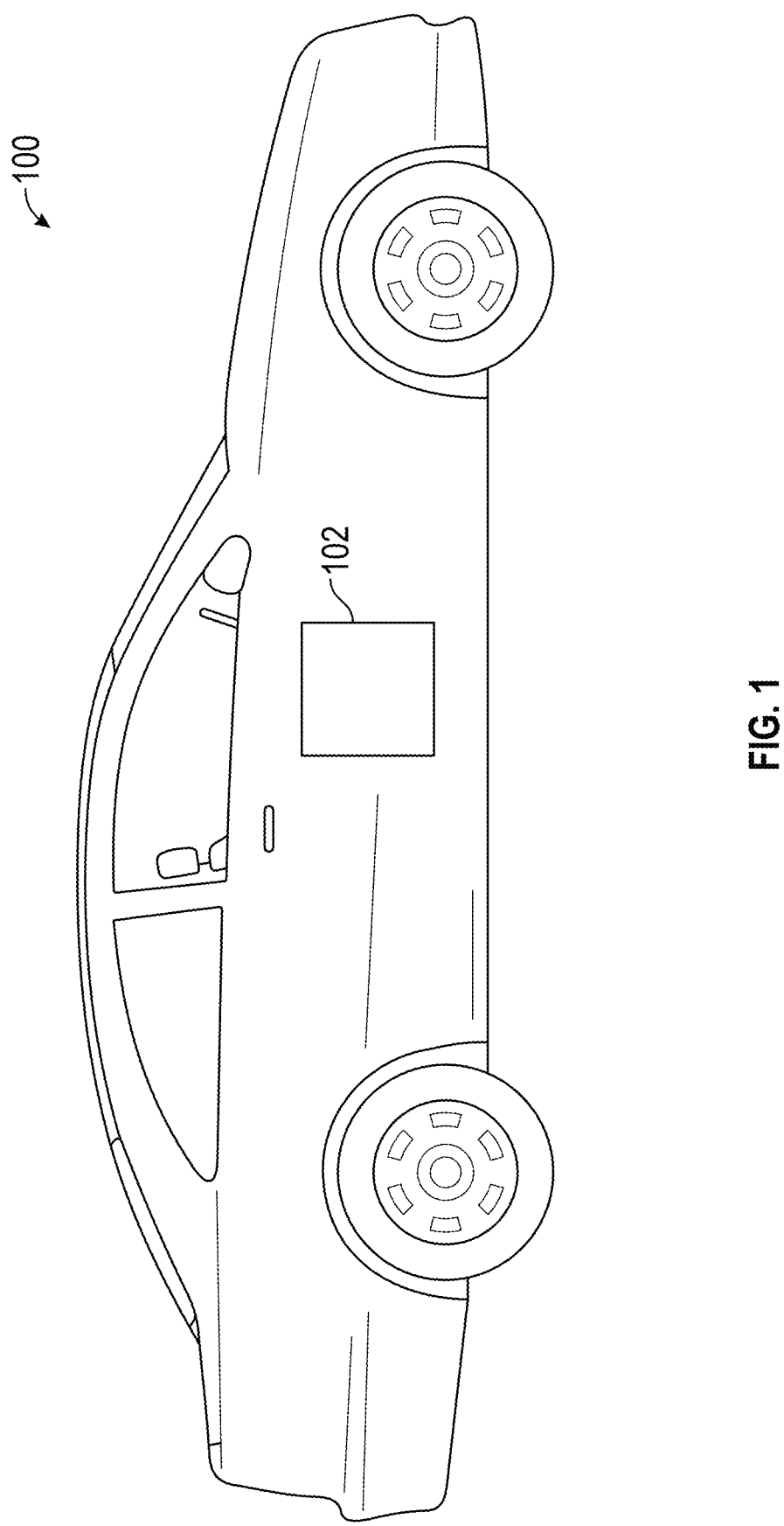
FIG. 1 shows a vehicle in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a vehicle 100. The vehicle 100 includes an electrical system 102 for operating various electrical loads of the vehicle. The vehicle 100 can be a gasoline-powered vehicle, a diesel-powered vehicle, a hybrid vehicle, an electric vehicle, etc. In various embodiments, the vehicle 100 is an electric vehicle employing a MODACS (Multiple Output Dynamically Adjustable Capacity System).

Figure 2:
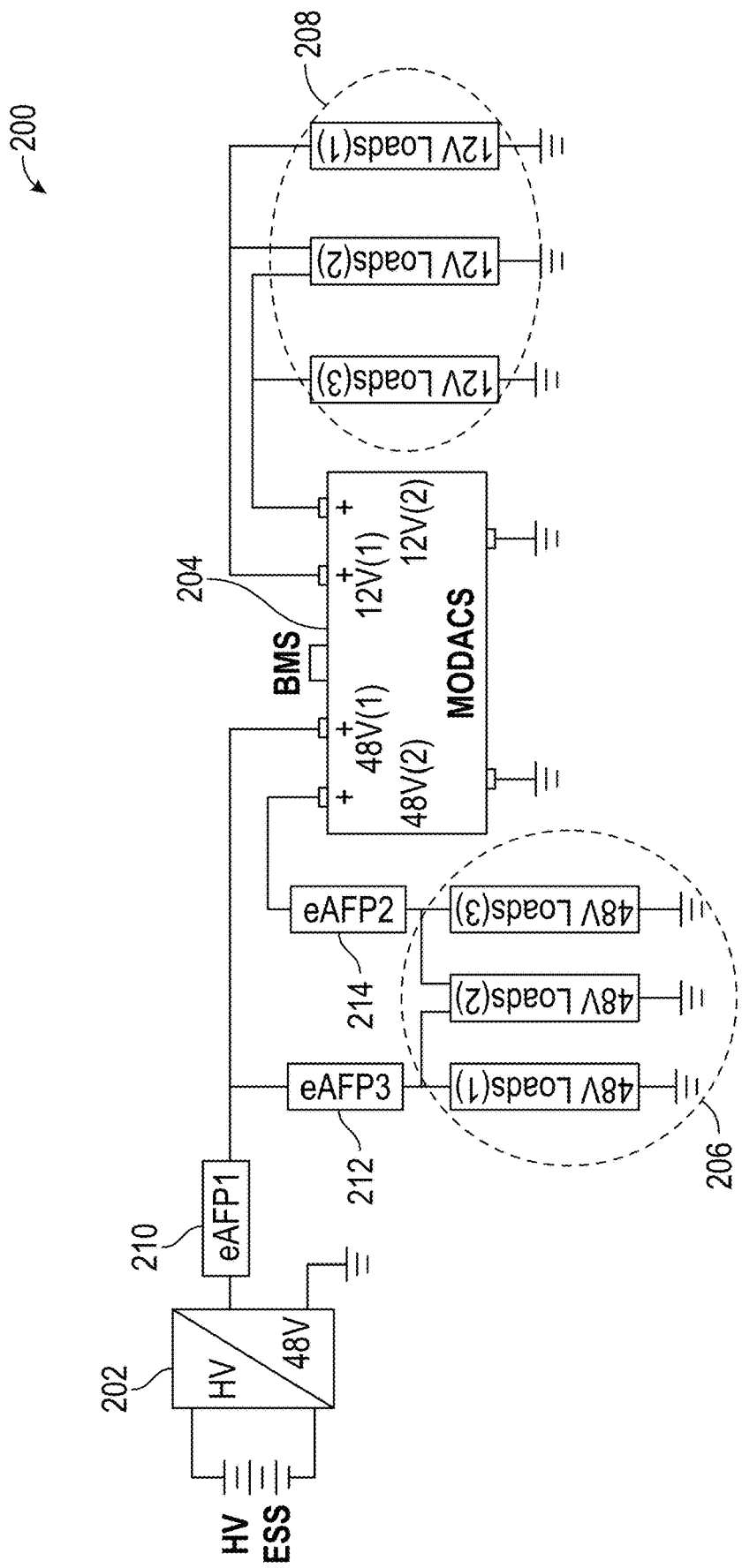
FIG. 2 shows a circuit diagram of an electrical system of the vehicle.

FIG. 2 shows a circuit diagram 200 of the electrical system 102 of the vehicle 100. The circuit diagram 200 includes a high voltage source 202 connected to a MODACS 204 (Multiple Output Dynamically Adjustable Capacity System), one or more high voltage loads 206 and one or more low voltage loads 208. The MODACS 204 separates the circuit into a high voltage side that includes the one or more high voltage loads 206 and a low voltage side that includes the one or more low voltage loads 208. The high voltage source 202 provides high voltage (e.g., +48 V) to the MODACS 204 and to one or more high voltage loads 206. The MODACS 204 provides a low voltage (e.g., +12 V) to the low voltage loads 208. In alternate embodiments, the electrical system 102 can operate without a MODACS 204.

The electrical system 102 also includes various arc fault protection devices for detecting and preventing or mitigating an occurrence of an arc fault. The arc fault protection devices can be placed at strategic locations within the electrical system 102. For illustrative purposes, a first arc fault protection device 210 is located at an output of the high voltage source 202, a second arc fault protection device 212 is located between the high voltage source 202 and the one or more high voltage loads 206, and a third arc fault protection device 214 is located between the high voltage loads 206 and the MODACS 204. Although not shown in FIG. 2, arc fault protection device can also be disposed on the low voltage side of the MODACS 204. Each arc fault protection device measures a current, filters and processes the current to detect an incipient arc fault, and takes measures to mitigate the arc fault once it is detected.

Figure 3:
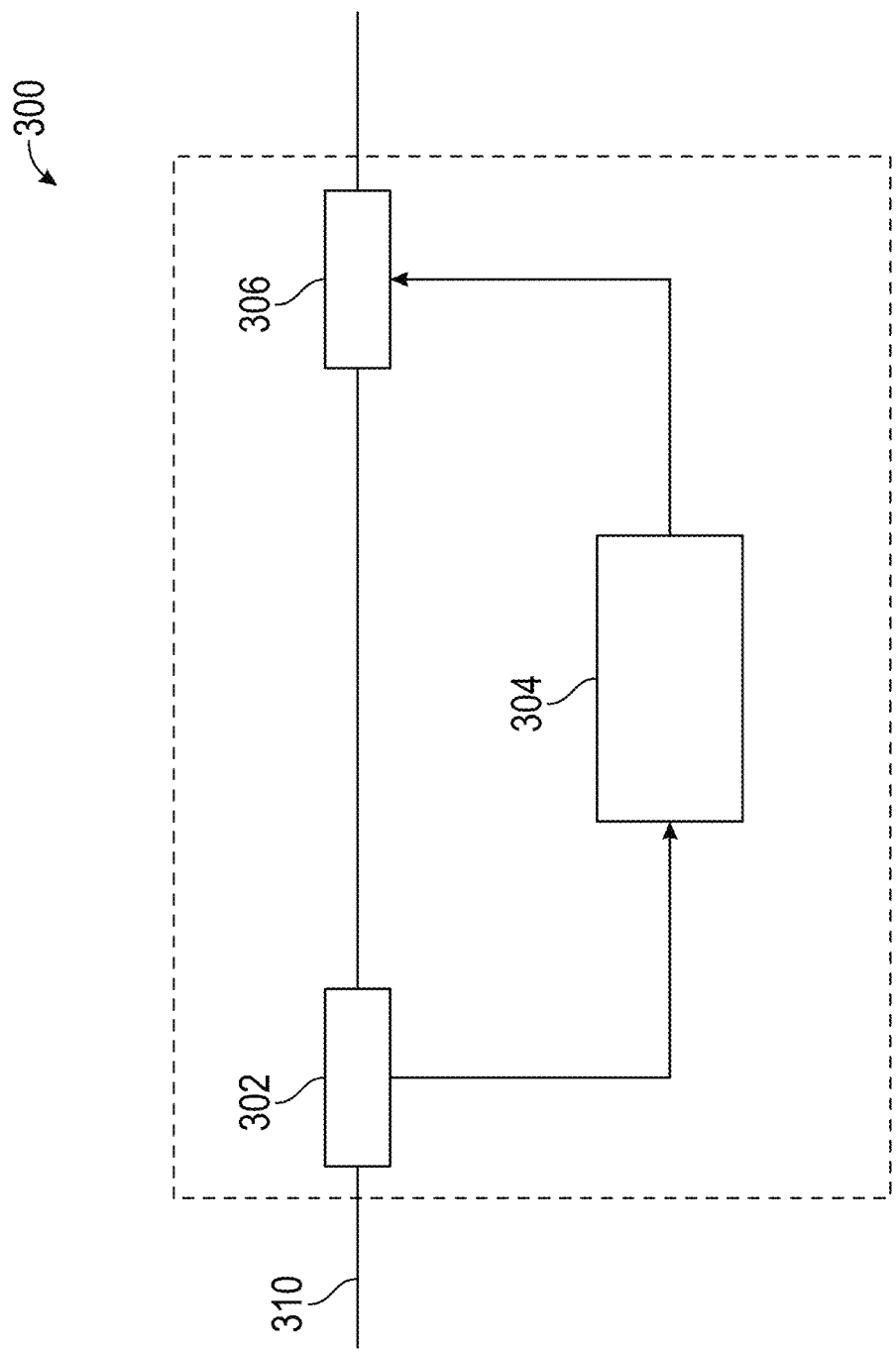
FIG. 3 shows a schematic diagram of an arc fault protection device.

FIG. 3 shows a schematic diagram 300 of an arc fault protection device. The arc fault protection device includes a current sensor 302, an arc fault detector 304 and a switch 306. The current sensor 302 measures a current flowing through a branch 310 of the electrical circuit. The current sensor 302 can be a high-bandwidth current sensor. In various embodiments, the current sensor 302 can be a core-based current sensor, a point field detector, a shunt-based detector, a Rogowski coil-based sensor, etc. The arc fault detector 304 can include a processor, such as a microprocessor, or other circuitry for evaluating the current and determining an onset of an arc fault from the current. The arc fault detector 304 can open the switch 306 when the evaluation of the current indicates that an arc flash is imminent. In various embodiments, the switch 306 can be an electrical fuse (eFuse) that operates via various transistors or a mechanical switch in series with a mechanical fuse.

Figure 4:
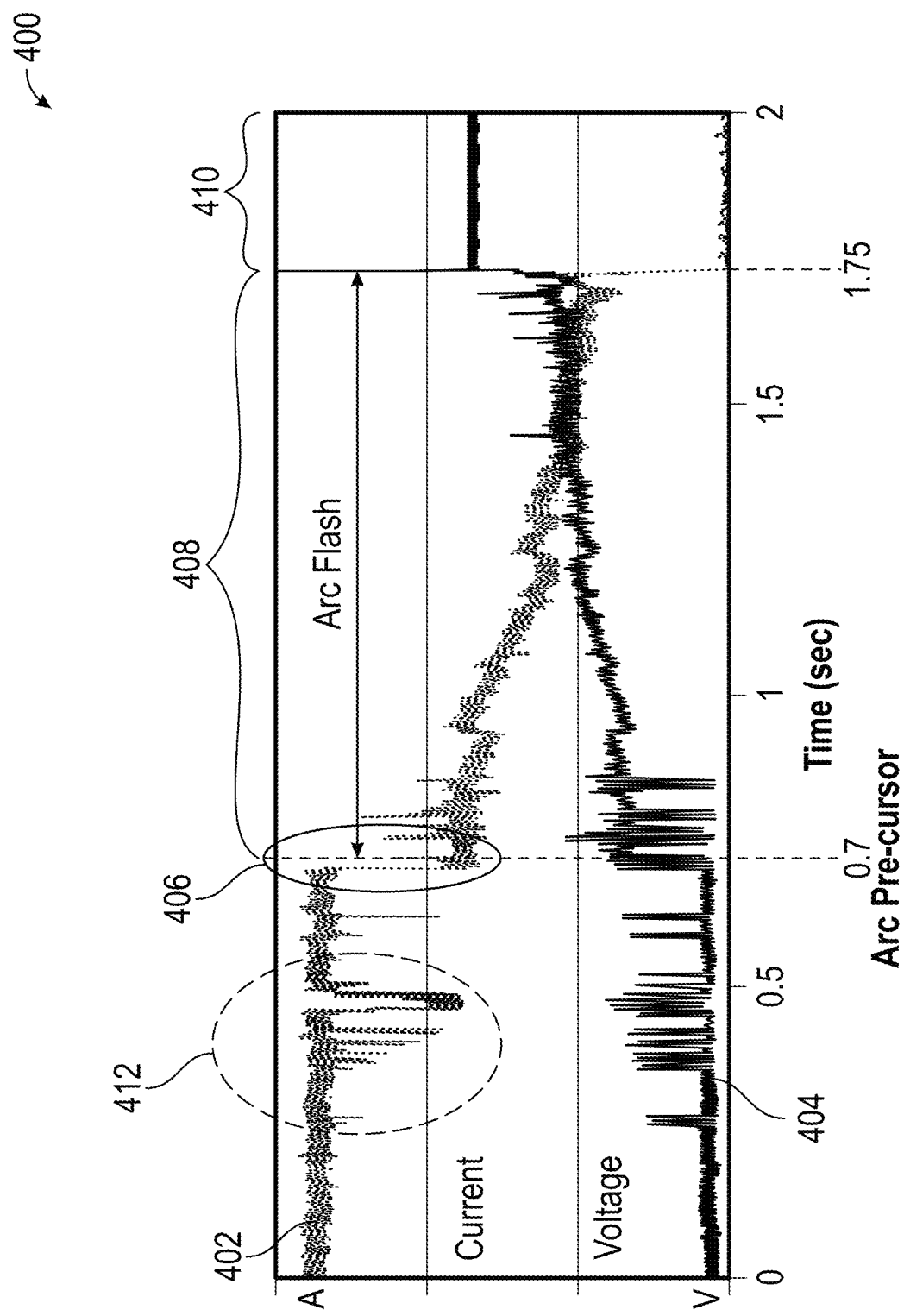
FIG. 4 is a graph showing an illustrative electrical signature of an arc fault, in an illustrative embodiment.

FIG. 4 is a graph 400 showing an illustrative electrical signature of an arc fault, in an illustrative embodiment, time is shown in seconds (s) along the abscissa and current and voltage are shown along the ordinate axis. The graph 400 shows both current 402 and a corresponding voltage 404. The current 402 is measured via the current sensor 302. As seen by the current 402, the arc fault has three distinct phases: a precursor phase 406, an arc flash phase 408 and an arc extinction phase 410. The precursor phase 406 (shown in graph 400 at about t=0.7 seconds) is a relatively short phase, lasting only a few milliseconds. The precursor phase 406 is characterized by the current 402 experiencing a sudden current drop that exceeds a given threshold. This current drop corresponds to an increase in voltage. The arc flash phase 408 can last up to several seconds. In FIG. 4, the arc flash phase 408 is shown from about t=0.7 seconds to about t=1.75 seconds. During the arc flash phase 408, the current arcs outside of the circuit. The current 402 is characterized by high-frequency, low amplitude variations in magnitude over time. The arc extinction phase 410 occurs once the current drops to zero, thereby ending the arc flash.

As can be seen in FIG. 4, the precursor phase 406 is indicated by the occurrence of a sudden current drop. It is noted however that the occurrence of a current drop does not necessarily indicate the onset of an arc flash phase. For example, in FIG. 4, a false precursor 412 occurs at about t=0.5 seconds. The method disclosed herein provides a method for discriminating between the precursor phase 406 and a false precursor 412.

Figure 5:
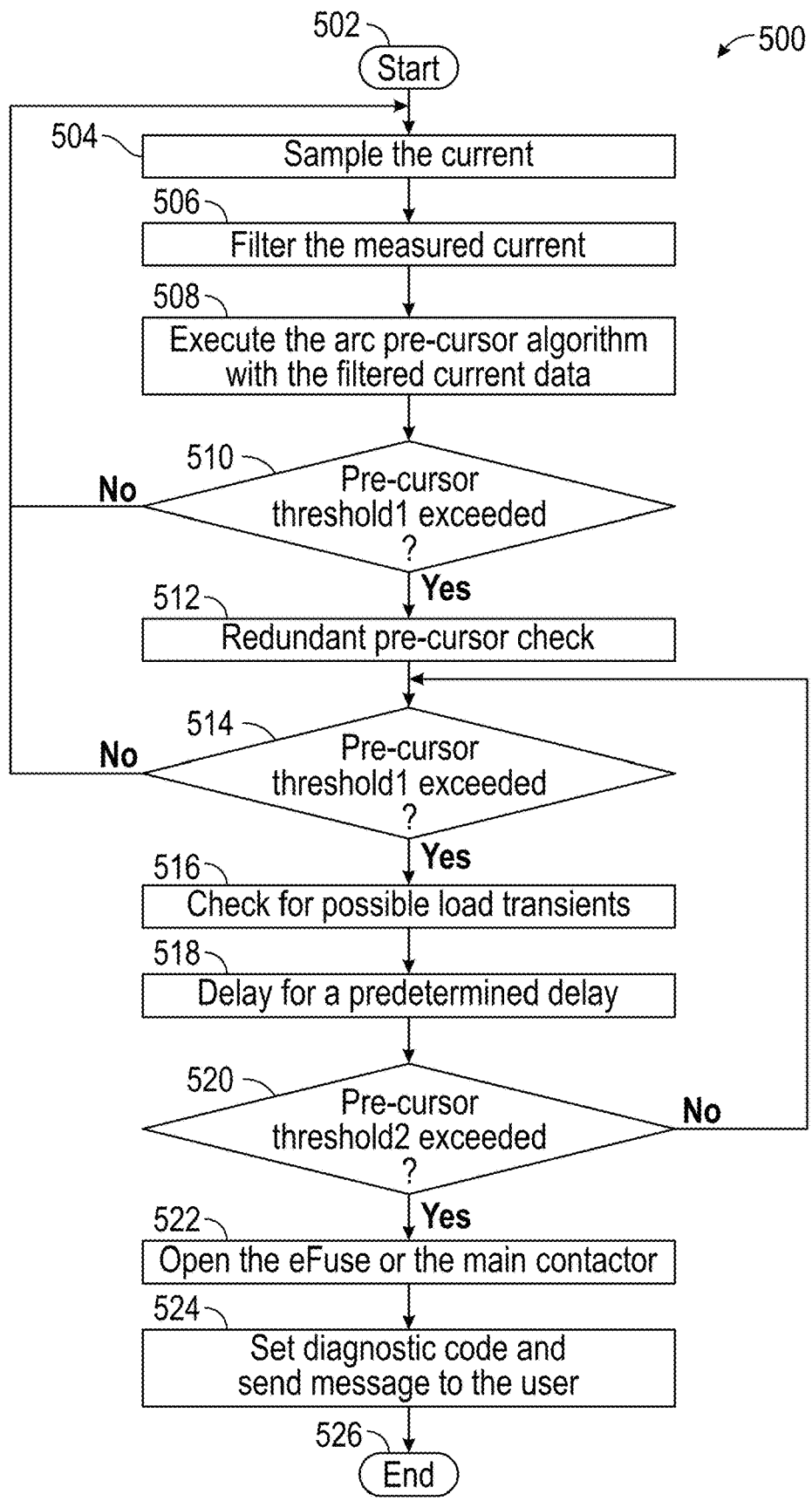
FIG. 5 is a flowchart of a method that can be performed at the arc fault protection device to detect an onset of an arc flash phase and mitigate an arc fault.

FIG. 5 is a flowchart 500 of a method that can be performed at the arc fault protection device to detect an onset of an arc flash phase and mitigate an arc fault. The method begins at box 502. In box 504, the current is sampled to obtain a measured current. In box 506, the measured current is filtered. In box 508, an arc precursor determination algorithm is executed on the measured and filtered current to generate a current signature. The current signature can be the current or the filtered current. The current signature can also be a result of a Fourier analysis of the current, a moving widow filtering of a time-derivative of the current, a wavelet analysis of the current and/or a hardware-based filtering of the current.

In box 510, the current signature is compared to a first precursor threshold. If the current signature is less than or equal to the first precursor threshold, the method returns to box 504 and further sampling of the current. In an embodiment, the current signature being less than the first precursor threshold means that a drop or change in the current over a pre-selected time frame is less than or equal to a first value. Returning to box 510, if the current signature exceeds the first precursor threshold, the method proceeds to box 512. In an embodiment, the current signature exceeding the first precursor threshold means that a drop or change in the current over a pre-selected time frame is greater than the first value.

In box 512, a redundant current check is performed on the current signature. In box 514, if the result of the redundant current check is that the current signature is less than the first precursor threshold, the method returns to box 504 for further current sampling. Returning to box 514, if the current signature exceeds the first precursor threshold, the method proceeds to box 516.

In box 516, the method checks for the occurrence of any possible load transients that may account for the current drop. In box 518, the method waits for a selected time delay. In various embodiments, the duration of the time delay is a few milliseconds. In box 520, the current signature is compared to a second precursor threshold. If the current signature is less than or equal to the second precursor threshold, the method returns to box 514 so that the current signature can be compared again to the first threshold. Returning to box 520, if the current signature exceeds the second precursor threshold, the method proceeds to box 522. In box 522, the switch 306 is opened. In box 524, a diagnostic code is set and a message is sent to a user, driver, or passenger of the vehicle. In box 526, the method ends. By detecting the precursor phase successfully, the arc fault protection device can prevent, mitigate and/or extinguish the arc fault during or before the arc flash phase 408.

Figure 6:
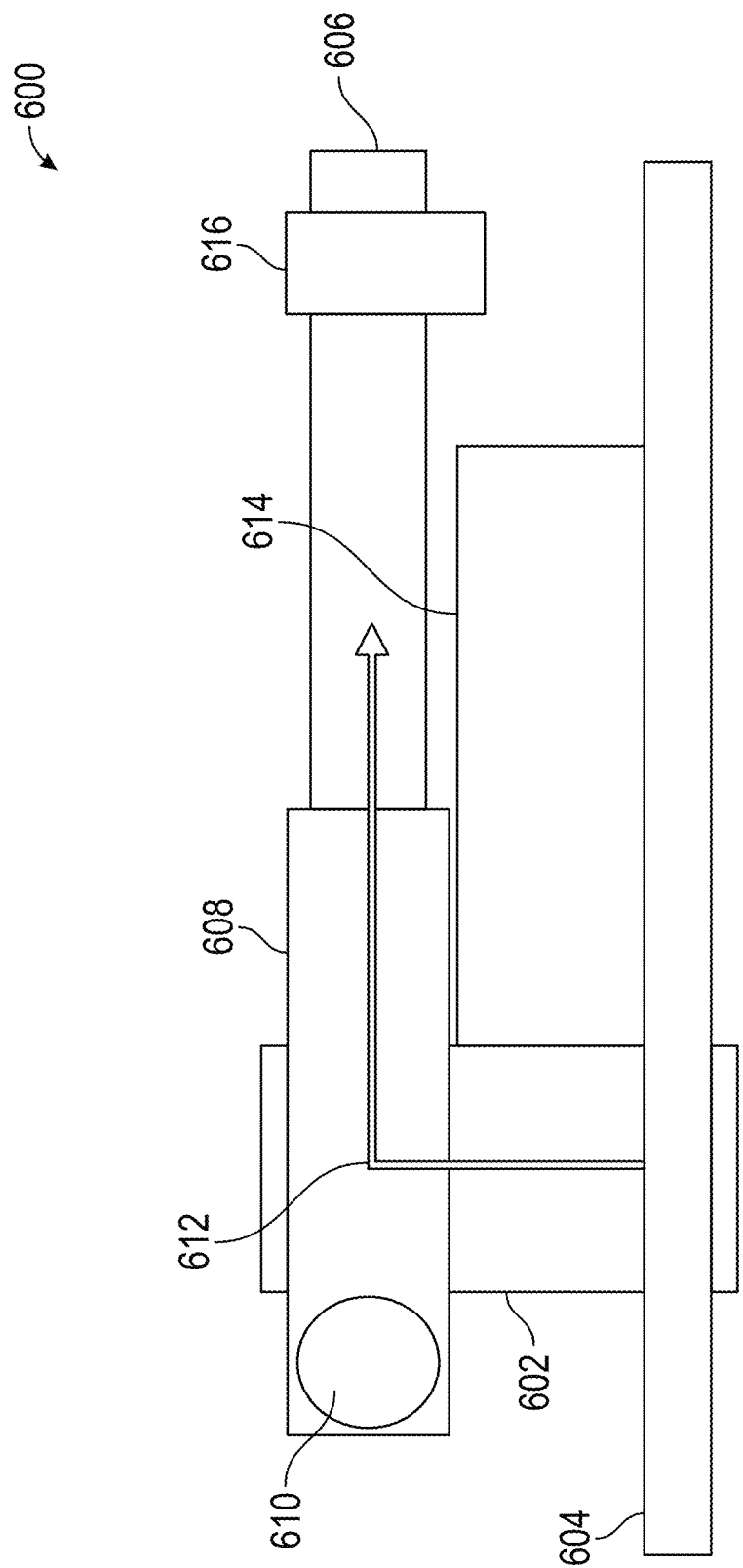
FIG. 6 shows a side view of a terminal post of the electrical system, in an embodiment.

FIG. 6 shows a side view 600 of a terminal post 602 of the electrical system 102, in an embodiment. The terminal post 602 extends from an electrical component 604, such as a battery or a printed circuit board. A cable 606 is attached to the terminal post 602 via a clamp 608 and bolt 610. A current 612 flows from the electrical component 604 through the terminal post 602 and into the cable 606. Sensor area 614 shows a strong field area in which a current sensor of an arc fault protection device can be placed. In various embodiments, a current sensor suitable for placement in sensor area 614 includes a coil-based current sensor or a point field detector. Switch area 616 is a location at which the switch of an arc fault protection device can be placed. The location of the switch (switch area 616) is "downstream" of the location of current sensor (sensor area 614).

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this invention belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for mitigating an arc fault in an electrical system of a vehicle, comprising:
   measuring a current in the electrical system;
   applying an algorithm to the measured current to generate a current signature from the measured current;
   comparing the current signature to a first precursor threshold by performing a first comparison of the current signal to the first precursor threshold followed by a second comparison of the current signal to the first precursor threshold;
   detecting a precursor phase of the arc fault from the first comparison and the second comparison of the current signature to the first precursor threshold, wherein the precursor phase indicates an onset of an arc flash phase of the arc fault; and
   opening a switch in the electrical system to mitigate the arc fault during the arc flash phase.

2. A method for mitigating an arc fault in an electrical system of a vehicle, comprising:
   measuring a current in the electrical system;
   applying an algorithm to the measured current to generate a current signature from the measured current;
   comparing the current signature to a first precursor threshold;
   detecting a precursor phase of the arc fault from the comparison of the current signature to the first precursor threshold, wherein the precursor phase indicates an onset of an arc flash phase of the arc fault;
   comparing the current signature to a second precursor threshold at a selected time after comparing the current signature to the first precursor threshold; and
   opening the switch to mitigate the arc fault during the arc flash phase when the current signature exceeds the second precursor threshold.

3. The method of claim 2, wherein the switch is one of: (i) an electrical fuse; and (ii) a mechanical switch in series with a mechanical fuse.

4. The method of claim 2, wherein the vehicle is one of: (i) an electric vehicle; (ii) a hybrid vehicle; (iii) a gasoline-powered vehicle; and (iv) a diesel-powered vehicle.

5. The method of claim 2, wherein generating the current signature further comprises at least one of: (i) filtering the current; (ii) performing a Fourier analysis of the current; (iii) performing a moving window filtering of a time-derivative of the current; and (iv) performing a wavelet analysis of the current.

6. An arc fault protection device for use in a vehicle, comprising:
   a sensor for measuring a current in an electrical system;
   a switch; and
   a processor configured to:
      apply an algorithm to the measured current to generate a current signature from the measured current;
      compare the measured current signature to a first precursor threshold by performing a first comparison of the current signal to the first precursor threshold followed by a second comparison of the current signal to the first precursor threshold;
      determine a precursor phase of an arc fault from the first comparison and the second comparison of the current signature to the first precursor threshold, wherein the precursor phase indicates an onset of an arc flash phase of the arc fault; and
      open the switch to mitigate the arc fault during the arc flash phase.

7. An arc fault protection device for use in a vehicle, comprising:
   a sensor for measuring a current in an electrical system;
   a switch; and
   a processor configured to:
      apply an algorithm to the measured current to generate a current signature from the measured current;
      compare the measured current signature to a first precursor threshold;
      determine a precursor phase of an arc fault from a comparison of the current signature to the first precursor threshold, wherein the precursor phase indicates an onset of an arc flash phase of the arc fault;

compare the current signature to a second precursor threshold at a selected time after comparing the current signature to the first precursor threshold; and open the switch to mitigate the arc fault during the arc flash phase when the current signature exceeds the second precursor threshold.

8. The arc fault protection device of claim 7, wherein the switch is one of: (i) an electrical fuse; and (ii) a mechanical switch in series with a mechanical fuse.

9. The arc fault protection device of claim 7, wherein the vehicle is one of: (i) an electric vehicle; (ii) a hybrid vehicle; (iii) a gasoline-powered vehicle; and (iv) a diesel-powered vehicle.

10. The arc fault protection device of claim 7, wherein the processor is further configured to generate the current signature by performing at least one of: (i) filtering the current; (ii) performing a Fourier analysis of the current; (iii) performing a moving window filtering of a time-derivative of the current; and (iv) performing a wavelet analysis of the current.

11. A vehicle, comprising:
a sensor for measuring a current in an electrical circuit of the vehicle;
a switch; and
a processor configured to:
apply an algorithm to the measured current to generate a current signature from the measured current;
compare the measured current signature to a first precursor threshold by performing a first comparison of the current signal to the first precursor threshold followed by a second comparison of the current signal to the first precursor threshold;
determine a precursor phase of an arc fault in the electrical circuit from the first comparison and the second comparison of the current to the first precursor threshold, wherein the precursor phase indicates an onset of an arc flash phase of the arc fault; and
open the switch in the electrical circuit to mitigate the arc fault during the arc flash phase.

12. A vehicle, comprising:
a sensor for measuring a current in an electrical circuit of the vehicle;
a switch; and
a processor configured to:
apply an algorithm to the measured current to generate a current signature from the measured current;
compare the current signature to a first precursor threshold;
determine a precursor phase of an arc fault in the electrical circuit from a comparison of the current to the first precursor threshold, wherein the precursor phase indicates an onset of an arc flash phase of the arc fault;
compare the current signature to a second precursor threshold at a selected time after comparing the current signature to the first precursor threshold; and
open the switch to mitigate the arc fault during the arc flash phase when the current signature exceeds the second precursor threshold.

13. The vehicle of claim 12, wherein the switch is one of: (i) an electrical fuse; and (ii) a mechanical switch in series with a mechanical fuse.

14. The vehicle of claim 12, wherein the vehicle is one of: (i) an electric vehicle; (ii) a hybrid vehicle; (iii) a gasoline-powered vehicle; and (iv) a diesel-powered vehicle.

15. The vehicle of claim 12, wherein the processor is further configured to generate the current signature by performing at least one of: (i) filtering the current; (ii) performing a Fourier analysis of the current; (iii) performing a moving window filtering of a time-derivative of the current; and (iv) performing a wavelet analysis of the current.

16. The method of claim 2, further comprising measuring the current using one of: (i) a coil-based current sensor; and (ii) a point field detector.

17. The arc fault protection device of claim 7, wherein the sensor is one of: (i) a coil-based current sensor; and (ii) a point field detector.

18. The vehicle of claim 12, wherein the sensor is one of: (i) a coil-based current sensor; and (ii) a point field detector.

19. The method of claim 1, further comprising detecting the precursor phase when the current signal exceeds the first precursor threshold during the first comparison and during the second comparison.

20. The arc fault protection device of claim 6, wherein the processor is further configured to detect the precursor phase when the current signal exceeds the first precursor threshold during the first comparison and during the second comparison.

* * * * *